United States Patent [19]

Daniels et al.

[11] Patent Number: 4,736,452
[45] Date of Patent: Apr. 5, 1988

[54] CORE COUPLED TRANSMITTER/RECEIVER LOOPS FOR CONNECTORLESS ENTERTAINMENT SYSTEMS

[75] Inventors: James W. Daniels, Kent; Carl W. Erickson, Maple Valley, both of Wash.

[73] Assignee: The Boeing Company, Seattle, Wash.

[21] Appl. No.: 908,450

[22] Filed: Sep. 17, 1986

[51] Int. Cl.⁴ .............................. H04B 5/00
[52] U.S. Cl. ........................... 455/41; 455/3; 379/55; 381/77; 381/79; 336/212
[58] Field of Search .................. 455/3, 41, 57; 340/310 R, 310 A; 379/55; 381/77–79; 333/1, 24 R; 336/212, 214, 221

[56] References Cited

U.S. PATENT DOCUMENTS

| 3,173,119 | 3/1965 | Thompson | 336/214 |
| 3,461,758 | 8/1969 | Michiulis | 336/212 |
| 3,553,675 | 1/1971 | Shaver et al. | 340/310 A |
| 4,352,200 | 9/1982 | Oxman | 455/41 |
| 4,428,078 | 1/1984 | Kuo | 455/41 |
| 4,528,677 | 7/1985 | Ise et al. | 379/55 |

FOREIGN PATENT DOCUMENTS 3106302 10/1982 Fed. Rep. of Germany ........ 381/79

*Primary Examiner*—Michael A. Masinick
*Attorney, Agent, or Firm*—Conrad O. Gardner; B. A. Donahue

[57] ABSTRACT

A method and apparatus for interconnecting passenger entertainment service units to the aircraft system through connectorless inductive couplers. Couplers are arranged along the seat track as desired without limitation on seat spacing or location.

4 Claims, 2 Drawing Sheets

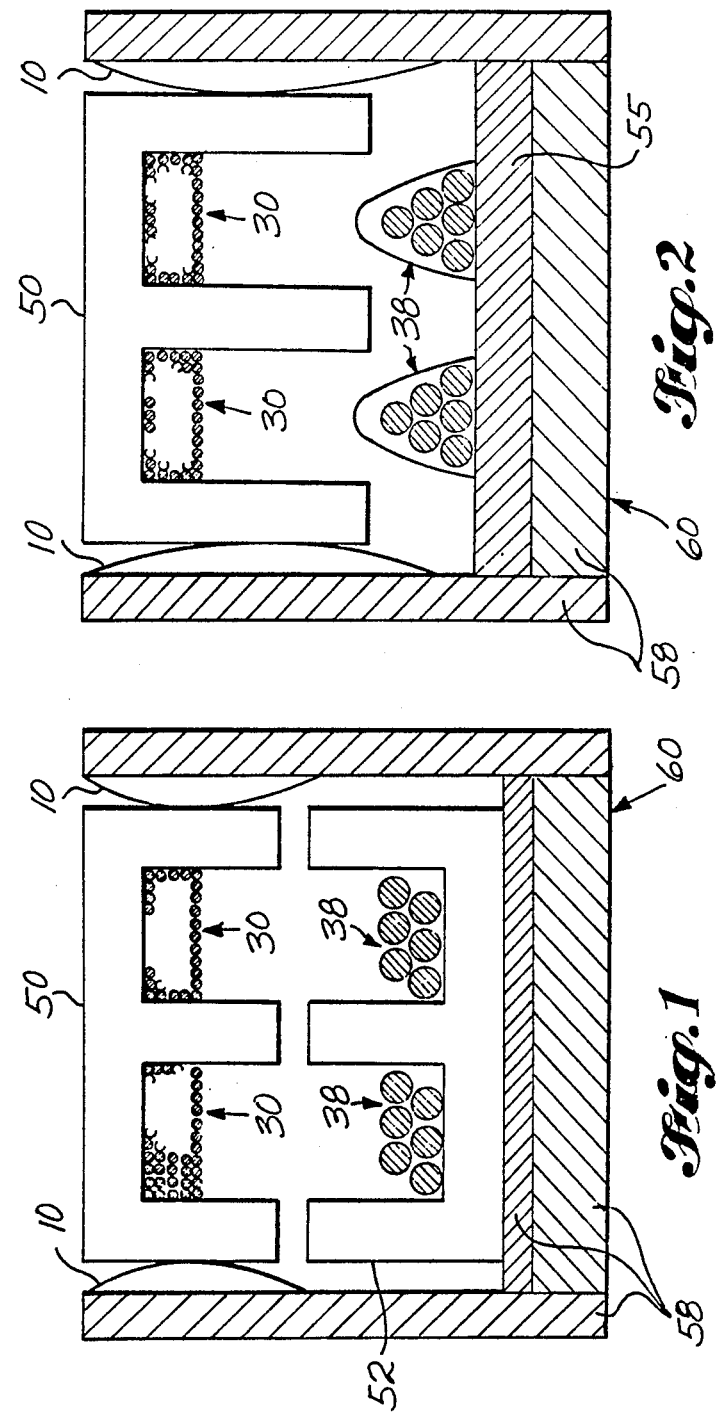

CORE COUPLED TRANSMITTER/RECEIVER LOOPS FOR CONNECTORLESS ENTERTAINMENT SYSTEMS

BACKGROUND OF THE INVENTION

This invention relates to passenger entertainment systems and more particularly to core coupled passenger entertainment systems for increasing the power transfer capability between entertainment system transmitter and passenger seat disposed receivers.

Heretofore the patent literature as exemplified by U.S. Pat. No. 4,428,078 has disclosed the transmission of power and multiplexed data from the passenger entertainment system transmitter through parallel transmission lines on the aircraft floor to an air core multi-turn loop located in the seat leg framework at feet locations. Such configuration has not been found to provide efficient power transfer from the entertainment system transmitter to the passenger seat disposed receivers.

Accordingly, it is an object of the present invention to provide a means for increasing the power transfer capability between an entertainment system transmitter and the individual seat disposed receiver units in the passenger entertainment system while also reducing the effects of conductive objects through control of the electromagnetic environment of the passenger entertainment system transmitter loop.

It is a further object of the present invention to provide reduction in radiated fields from the passenger entertainment system transmitter by disposition of the transmitter loop on a ferromagnetic material, and providing by means of the present embodiments of the invention a further reduction in radiated fields wherein the transmitter loop is disposed in a conductive trough. Accordingly by controlling the field, the radiated electromagnetic interference (EMI) is thereby reduced, as well as circuit sensitivity to surrounding conductive objects.

The individual passenger receiver loops are adapted for installation individually thereby permitting installation and latching thereof through simple individual seat mountings.

Accordingly automatic electrical coupling is provided upon seat installation.

Each seat module may be installed at any location along the passenger entertainment system transmitter loop without installation or disconnection of special hardware.

In contrast with the aforementioned parallel transmission line utilized in U.S. Pat. No. 4,428,078 the present passenger entertainment transmitter is coupled through an output multi-turn loop.

Typical commercial aircraft passenger entertainment and service systems are hard wired thereby requiring many cables and connectors for interconnection to seat receiver systems. A typical installation requires the installation of permanent wire bundles in aircraft structure routed to convenient locations along the fuselage or beneath the floor. The nearest seat module, in a group of seat modules, is connected to the permanent wiring and then all remaining seat modules are linked, in a daisy-chain fashion, from one to another in succession. Interconnecting cables are concealed and protected in a trough running parallel to the seat tracks as a consequence can be seen that any radical change in seat configuration requires the fabrication of new interconnect cables of the proper length to match the new seating spacing dimensions. Seat removal or configuration changes require a labor intensive effort as can readily be appreciated. In contrast embodiments according to the present invention enable coupling of the receiver disposed seat modules through their individual receiver loops to a single multi-turn transmitter loop disposed in a trough running parallel to the seat tracks without the physical connection therebetween. Coupling therebetween in accordance with the embodiments of the present invention is instead by transformer coupling through a ferrite core.

BRIEF DESCRIPTION OF THE DRAWINGS

FIG. 1 is a vertical sectional view of a first embodiment of core coupling between receiver and transmitter loops in a passenger entertainment system;

FIG. 2 is a second embodiment of core coupling between transmitter and receiver loops in a passenger entertainment system.

DESCRIPTION OF THE PREFERRED EMBODIMENTS

Figure 3:
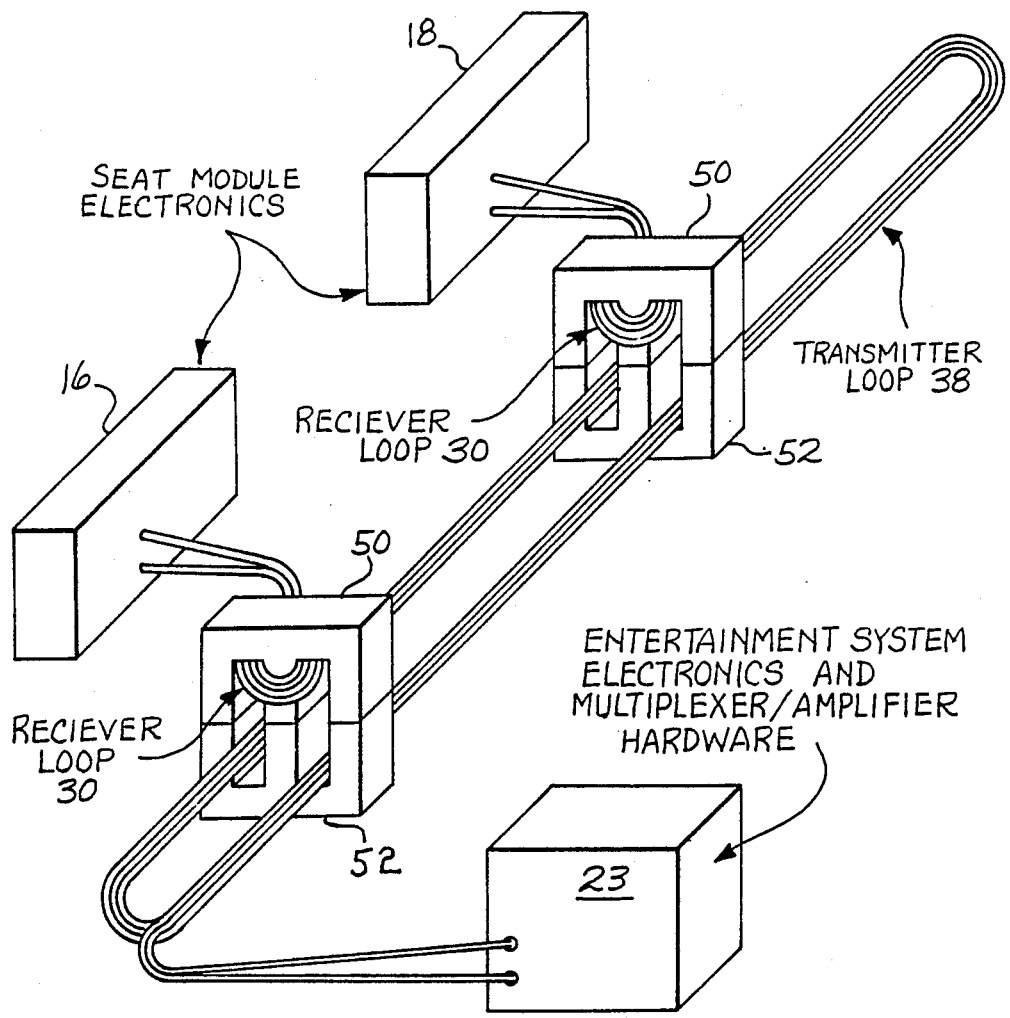
FIG. 3 is a diagrammatic perspective view of the present passenger entertainment system showing transmitter loop and receiver loops coupled by means of core coupling in accordance with the first embodiment shown in FIG. 1.

Briefly now turning to FIGS. 1 and 2 there will be seen first and second embodiments of transformer ferrite core coupling arrangements utilized between the passenger entertainment system transmitter loop 38 and individual receiver loops 30. The transformer core coupling of the embodiment of FIG. 1 is termed an E/E coupler since both the receiving portion of the transformer core 50 and the transmitter portion of the ferrite core coupler 52 are shaped in the form of an E. In the embodiment of FIG. 2 the receiver portion 50 is E-shaped while the transmitter core portion 55 is I-shaped and thus a consequence the embodiment of FIG. 2 is termed an E/I coupler.

Seat receivers 16 and 18 (and more receivers as necessary) have already been shown as represented by numerals 16 and 18 in FIG. 1 of U.S. Pat. No. 4,428,078 also assigned to The Boeing Company. A more detailed description of these receivers is given in the aforesaid patent and details thereof may be referred to as necessary and are incorporated herein by reference. A receiver loop 30 also identified under the numeral 30 is shown in U.S. Pat. No. 4,428,078. In FIG. 3 of this application the transmitter loop 38 is seen to be a multi-turn loop. Multi-turn transmitter loop 38 is located parallel to the seat track so that each of the individual receiver loops 30 may be coupled through E/E or E/I couplers to the transmitter loop 38. While the E/E coupler embodiment of FIG. 1 is shown in the system diagram of FIG. 3 for purposes of illustration, the E/I coupler of the embodiment of FIG. 2 may also be utilized. Guide springs 10 are shown in the embodiment of FIGS. 1 and 2 to permit insertion and retention of the receiver core portions 50 within trough 60. Troughs 60 include members 58 of iron or ferrite which form the U-shaped trough 60 surrounding the E/E or E/I couplers. Multi-turn transmitter loop 38 may be considered the primary of the transformer core E/E and E/I couplers, while receiver loop 30 may be considered the secondary of the couplers. It can be seen that the primary (transmitter) winding 38 is permanently mounted in trough 60 at the floor of the aircraft while secondary windings 30 carried by the E-shaped receiver core portion 50 of the couplers can be placed at any position along the primary transmitter loop 38 to form the present core coupled transmitter/receiver connectorless entertainment system. The secondary receiver loop 30 is lured onto the primary transmitter loop 38 at the time the seats are installed.

The power transfer capability of the present system has been demonstrated to provide a typical power transfer of 10 watts with short term maximum power transfers of up to about 25 watts. The present system utilizing ferrite core configurations as shown in the first and second embodiments has provided the increased flux linkages between transmitter loop 38 and receiver loops 30 while providing for control of the radiated EMI fields.

What is claimed is:

1. A passenger entertainment system for transmission by simultaneous coupling of receiver power and intelligence information signals to a plurality of seat units, said system comprising:
    transmitter means for generating said receiver power and intelligence information signals;
    receiver means associated with each of said plurality of seat units;
    a multi-turn transmitter loop coupled to said transmitter means;
    a multi-turn pick up loop coupled to said receiver means associated with each of said plurality of seat units;
    ferrite core transformer means disposed between said multi-turn pick up loop and said multi-turn transmitter loop for transferring said receiver power and intelligence information signals therebetween;
    said ferrite core transformer means having a receiver core portion associated with each of said multi-turn pick up loops;
    a U-shaped trough running parallel to the seat tracks of said seat units; and,
    said U-shaped trough surrounding said ferrite core transformer means.

2. The invention according to claim 1 wherein said ferrite core transformer comprises first and second generally E-shaped cores.

3. The invention according to claim 1 wherein said ferrite core transformer comprises a first generally E-shaped core and a second generally I-shaped core.

4. The invention according to claim 1 wherein each of said multi-turn pick up loops is wound about the central leg portion of said first of said generally E-shaped cores, and said transmission line comprises a multi-turn loop disposed along the slots formed by the side leg portions of said second generally E-shaped cores.

* * * * *